D. C. POYNTER.
TIRE ARMOR.
APPLICATION FILED FEB. 17, 1921.

1,405,327.

Patented Jan. 31, 1922.

INVENTOR.
D. C. POYNTER,
BY Franklin H. Hough
ATTORNEY.

UNITED STATES PATENT OFFICE.

DAVID C. POYNTER, OF MOUNT VERNON, KENTUCKY.

TIRE ARMOR.

1,405,327. Specification of Letters Patent. Patented Jan. 31, 1922.

Application filed February 17, 1921. Serial No. 445,741.

*To all whom it may concern:*

Be it known that I, DAVID C. POYNTER, a citizen of the United States, residing at Mount Vernon, in the county of Rockcastle and State of Kentucky, have invented certain new and useful Improvements in Tire Armors, of which the following is a specification, reference being had therein to the accompanying drawings.

This invention relates to tire armors and has for an object to provide an armor adapted to be associated with tires of various types and embodying new and improved features of reliability, convenience and economy.

A further object of the invention is to provide a tire armor made up of identical units which can be die-stamped from sheet metal and which will be clamped upon a tire readily and conveniently and securely by the user.

A further object of the invention is to provide a tire armor made up of improved units adapted to be associated with any type of tire, but more especially with a pneumatic tire with an improved latch for latching together the terminal units into a complete armor about the tire.

With these and other objects in view the device comprises certain novel units, elements, parts, functions and combinations as will be hereinafter more fully described and claimed.

In the drawings.

Like characters of reference indicate corresponding parts throughout the several views.

The improved armor which forms the subject matter of this application is designed for use especially with pneumatic tires, as indicated at 10, although it is to be understood that it is not limited to pnematic tires, but may be employed on tires of various types and constructions.

Figure 1:
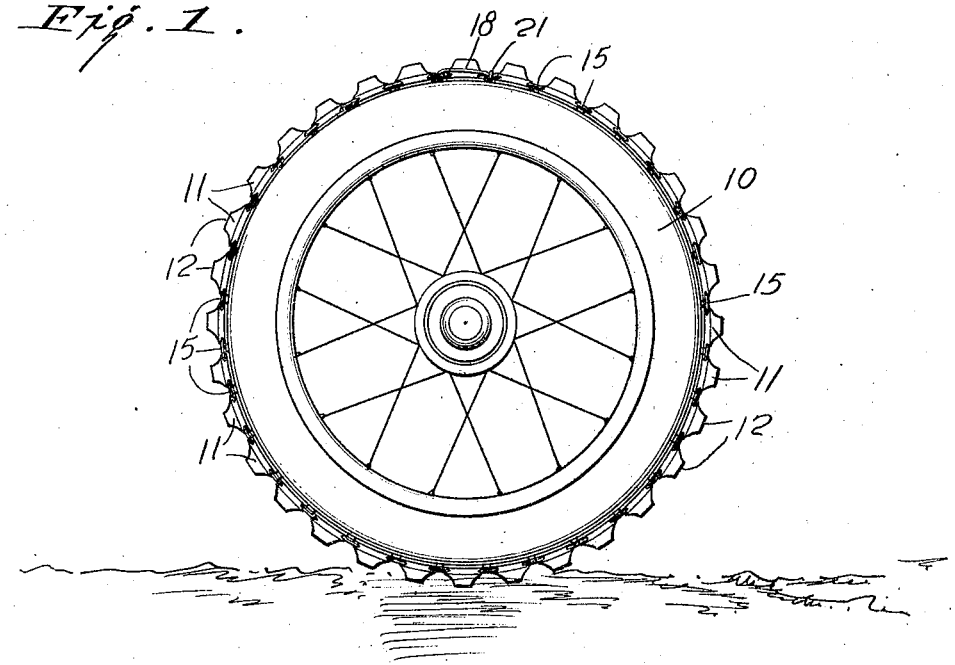
Figure 1 is a view of a conventional wheel in side elevation, having a conventional pneumatic tire thereon with the improved armor in operative position thereabout.
Figure 2:
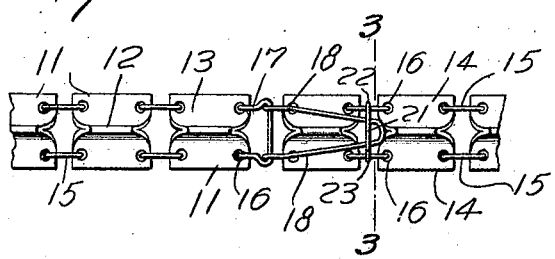
Figure 2 is a view in plan of a number of the armor units, showing the latch in closed and latched position.
Figure 3:
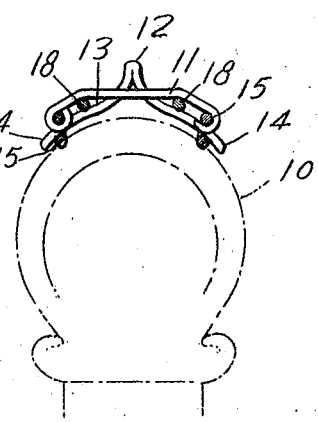
Figure 3 is a transverse sectional view taken on line 3—3 of Figure 2.
Figure 4:
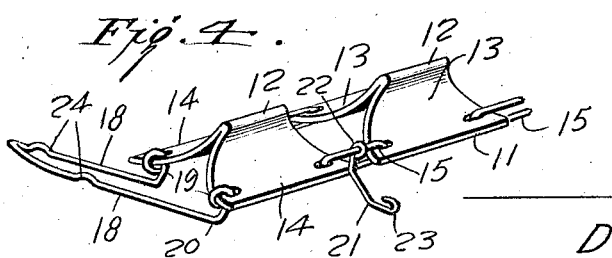
Figure 4 is a perspective view of one terminal of the armor structure showing the latch and keeper open.

The armor comprises a plurality of units, each indicated as an entirety at 11, comprising a sheet of material preferably die-stamped to form an apex 12, the walls of which, 13, are inclined and curved so that exteriorly they are concave. The outer extremities, or skirts, of the units indicated at 14 are designed to engage upon or adjacent to the tire 10, being spaced therefrom only by the links 15, by which the several units are united, the links extending through perforations 16 in the units themselves. The uniting of a sufficient number of the units 11 by the links 15 produces an armor of sufficient length to extend about the periphery of the tire 10, shown at Figure 1. The terminal units, instead of being provided with the links 15 are provided only with a loop 17 engaging the opening 16 in the opposite edges of the unit and proportioned to receive and accommodate the latch bail 18. The bail 18 is pivoted by means of eyes 19 in the opening 16 in the terminal unit opposite that provided with the loop 17. The bail 18 is so proportioned as to be inserted through the loop 17 from a position toward to a position opposite the hub of the wheel and to be fulcrumed upon the eyes 19 as pivots, until the loop 17 engages in the bends 20, which permits the bail 18 to fold over one of the terminal units, the members being such as to accommodate themselves upon opposite sides of the apex 12. Between such terminal unit and the next unit, the links 15 are provided with a keeper 21 which is permanently secured to one of the links by an eye 22, carrying at the opposite end a hook 23 adapted to hook over the opposite link 15 upon the bail 18 and accommodated in the curves 24. It is obvious that when the bail 18 is inserted through the loop 17 it serves as a lever for drawing the armor structure tautly about the tire, and when it is latched down by the keeper 21 it will retain such bail in latched position and consequently the armor in taut position upon the exterior of the tire 10.

In operation, of course, the wheel will be rolled upon the armor, which will be spread upon the ground in the usual manner, and the opposite ends, or terminals brought up about the tire until the bail 18 can be inserted through the loop 17, whereupon such bail is employed as a keeper to draw the terminals of the armor together, and when such condition has been reached, it is clamped or latched downwardly by the use of the keeper 21. To remove the armor, the reverse actions are followed by first releasing the bail from the keeper 21 and the bail then from the loop 17, whereupon the armor structure is freed from engagement with the tire and may be removed.

What I claim to be new is:

1. A tire armor comprising a unit composed of sheet metal folded upon itself along a median line to form an apex and the sections flared outwardly away from each other with perforations approximately at the corners of the outwardly flared sections, links through the perforations connecting said unit with other similar units with the several apexes upon one side, a loop having its extremities pivoted in the perforations of one of the terminal units, a bail having its apexes pivoted in the perforations of the other terminal unit and proportioned to be inserted through the loop, and a keeper for retaining the bail in latched position.

2. A tire armor comprising a unit composed of sheet metal folded upon itself along a median line to form an apex and the sections flared outwardly away from each other with perforations approximately at the corners of the outwardly flared sections, links through the perforations connecting said unit with other similar units with the several apexes upon one side, a loop having its extremities pivoted in the perforations of one terminal unit, a bail bent upon itself having its extremities pivoted in the perforations of the other terminal unit and proportioned to be inserted through the loop, a keeper having means at its opposite ends for engaging and sliding upon some of said links, said bail and said keeper being so proportioned that the bail will close downwardly to embrace the apex of one of the terminal units and the keeper will slide along said links to engage over and retain the bail.

In testimony whereof I hereunto affix my signature in presence of two witnesses.

DAVID C. POYNTER.

Witnesses:
J. W. BROWN,
T. C. O'MARA.